United States Patent
Schatz et al.

(10) Patent No.: US 10,060,172 B2
(45) Date of Patent: Aug. 28, 2018

(54) VARIABLE RESISTANCE CONDUCTIVE RUBBER SENSOR AND METHOD OF DETECTING AN OBJECT/HUMAN TOUCH THEREWITH

(71) Applicant: Magna Closures Inc., Newmarket (CA)

(72) Inventors: Kurt Matthew Schatz, Uxbridge (CA); Samuel R. Baruco, Aurora (CA); J. R. Scott Mitchell, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 20 days.

(21) Appl. No.: 15/236,591

(22) Filed: Aug. 15, 2016

(65) Prior Publication Data

US 2017/0052270 A1    Feb. 23, 2017

Related U.S. Application Data

(60) Provisional application No. 62/208,476, filed on Aug. 21, 2015.

(51) Int. Cl.
| | |
|---|---|
| *G01R 27/08* | (2006.01) |
| *E05F 15/42* | (2015.01) |
| *G01L 1/04* | (2006.01) |
| *E05F 15/75* | (2015.01) |
| *G01V 3/04* | (2006.01) |
| *B60N 2/00* | (2006.01) |

(52) U.S. Cl.
CPC .............. *E05F 15/42* (2015.01); *E05F 15/75* (2015.01); *G01L 1/04* (2013.01); *G01V 3/04* (2013.01); *B60N 2/002* (2013.01)

(58) Field of Classification Search
CPC ........ G01R 21/133; G01R 27/14; G06F 13/20
USPC ............. 324/76.11, 76.61, 76.69, 76.74, 103
See application file for complete search history.

(56) References Cited

U.S. PATENT DOCUMENTS

| | | | |
|---|---|---|---|
| 5,150,275 A | 9/1992 | Lee et al. | |
| 6,617,972 B2* | 9/2003 | Takarada | G08B 21/0484 |
| | | | 324/538 |
| 7,000,352 B2 | 2/2006 | Ishihara et al. | |
| 7,319,301 B2 | 1/2008 | Pribisic | |
| 7,821,275 B2 | 10/2010 | Wurstlein et al. | |
| 8,493,081 B2 | 7/2013 | Bolbocianu et al. | |
| 8,779,729 B2* | 7/2014 | Shiraishi | G01R 31/3606 |
| | | | 320/134 |
| 9,147,099 B2 | 9/2015 | Perezselsky et al. | |
| 2006/0288642 A1 | 12/2006 | Marentette | |

(Continued)

FOREIGN PATENT DOCUMENTS

WO    WO2008081209 A1    7/2008

*Primary Examiner* — Giovanni Astacio-Oquendo
(74) *Attorney, Agent, or Firm* — Dickinson Wright PLLC (57) ABSTRACT

A variable resistance conductive rubber sensor and method of detecting an object/human touch therewith is provided. The sensor has a sensor body constructed from electrically conductive rubber. The sensor body extends between opposite first and second ends. A first wire is operably connected to the first end and a second wire may be operably connected to the second end, with the first and second wires being brought into electrical communication with one another by the intermediately extending electrically conductive rubber of the sensor body. A microcontroller is operably connected to the sensor body to detect the presence of an applied force or human touch on the sensor body.

21 Claims, 9 Drawing Sheets

(56) References Cited

U.S. PATENT DOCUMENTS

| | | | |
|---|---|---|---|
| 2008/0062022 A1* | 3/2008 | Melanson | H03M 3/464 |
| | | | 341/143 |
| 2008/0079444 A1* | 4/2008 | Denison | G01D 5/24 |
| | | | 324/679 |
| 2009/0204350 A1* | 8/2009 | Govil | B81C 99/0045 |
| | | | 702/65 |
| 2010/0156440 A1 | 6/2010 | Weingartner et al. | |
| 2010/0244860 A1 | 9/2010 | Wisspeintner et al. | |
| 2012/0098518 A1* | 4/2012 | Unagami | G01R 22/066 |
| | | | 324/74 |
| 2015/0267453 A1 | 9/2015 | Matsumoto et al. | |
| 2015/0369941 A1 | 12/2015 | Pribisic et al. | |

\* cited by examiner

VARIABLE RESISTANCE CONDUCTIVE RUBBER SENSOR AND METHOD OF DETECTING AN OBJECT/HUMAN TOUCH THEREWITH

CROSS REFERENCE TO RELATED APPLICATION

This application claims the benefit of U.S. Provisional Application Ser. No. 62/208,476 filed Aug. 21, 2015, which is incorporated herein by reference in its entirety.

FIELD OF THE INVENTION

The present disclosure relates generally to sensors, and more particularly to pressure and pinch sensors for vehicles, such as for vehicle seats, windows and closure panels where it is desirable to detect the presence of a person or some other object.

BACKGROUND OF THE INVENTION

This section provides background information which is not necessarily prior art to the inventive concepts associated with the present disclosure.

It is known to apply pinch sensors to prevent a power-activated window or closure panel, such as a lift gate or side door, from closing if a foreign obstacle or object is detected just as the panel closes. It is further known to apply a switch to an automotive seat to detect the presence of a passenger, which in turn can activate or deactivate an inflationary restraint apparatus, often referred to as airbag. The pinch sensors and switches come in different forms, including non-contact sensors such as those based on capacitance changes, and contact sensors which rely on a physical deformation of the sensor caused by contact with a foreign object.

The contact pinch sensors are typically applied in the form of a rubber strip which is routed along and adjacent to the periphery of a vehicle door. The rubber strip is conductive and embeds two small diameter conductive wires which are typically spaced from one another, often by an air gap. When the two wires are caused to contact one another under an impact force applied directly onto an outer, nonconductive sheath, typically a non-conductive elastomeric material, wherein the outer sheath encases the inner conductive rubber strip and conductive wires, the electrical resistance between the wires drops, and a microcontroller operably connected to the two wires detects the drop in resistance or voltage, thereby detecting an object when the resistance or voltage drop exceeds a predetermined threshold. Some fundamental problems result with such conventional pinch sensors are as follows, in no particular order of importance: they generally have a limited activation angle, typically on the order of about 35 degrees along each side, and thus, in the event the pinch force is applied obliquely rather than head on, the wires may not contact one another; they are generally complex and costly in construction, largely due to the need for complex extrusion process and crimping process used to fix a resistor to the ends of the wires, and further due to the need for over-molding of a non-conductive cover about the ends; and further yet, the routing of such pinch sensors can compromise the effectiveness of the sensor due to creating false activations via bending stresses and displacement of the wires.

It is further known to utilize motor Hall effect sensors, particularly in vehicle window applications. Hall effect sensors are typically costly to implement, and further, in vehicle window applications, it can prove challenging to meet the maximum force limitation allowable under vehicle standards imposed by the DEPARTMENT OF TRANSPORTATION (DOT), National Highway Traffic Safety Administration, 49 CFR Part 571, RIN 2127-AG36, Federal Motor Vehicle Safety Standards, Power-Operated Window (FMVSS), Partition, and Roof Panel Systems, under standard FMVSS 118, incorporated herein by reference. Difficulties in meeting the standard stem largely from a lag in time between the initial sensing of an object to the reaction time of stopping and/or reversing the window.

It is therefore desired to provide a sensor/switch that obviates or mitigates at least one of the above-identified disadvantages.

SUMMARY OF THE INVENTION

This section provides a general summary of the disclosure and is not a comprehensive disclosure of its full scope or all of its features, aspects or objectives.

It is an aspect of the present disclosure to provide a variable resistance conductive rubber sensor element, also referred to as sensor body, for use in a powered closure system, including power lift gates, power windows, sun-roofs, deck-lids, and also in trim panel movement detection; exterior door handle activation pressure detection; non-planar switch applications, including occupant detection on a vehicle seat, for example.

It is a related aspect of the present disclosure to provide a variable resistance conductive rubber sensor body that is formable to attain any desired shape as viewed in lateral cross-section.

It is a related aspect of the present disclosure to provide a variable resistance conductive rubber sensor body that is formable to attain a varying shape as viewed in lateral cross-section.

It is a related aspect of the present disclosure to provide a variable resistance conductive rubber sensor body that is extrudable.

It is a related aspect of the present disclosure to provide a variable resistance conductive rubber sensor body that is moldable.

It is a related aspect of the present disclosure to provide a variable resistance conductive rubber sensor having a sensor body constructed from electrically conductive rubber, with the sensor body extending between opposite first and second ends. A first wire is operably connected to the first end via a first electrical connector.

It is a related aspect of the present disclosure to provide the variable resistance conductive rubber sensor with a microcontroller that is operably connected to the first wire, with the microcontroller being configured to detect the presence of external contact to the sensor body as a result of an increase in electrical resistance in response to the sensor body being elastically deformed.

It is a related aspect of the present disclosure to provide the variable resistance conductive rubber sensor with a microcontroller that is operably connected to the first wire, with the microcontroller being configured to detect the presence of external contact to the sensor body as a result of an increase in electrical resistance in response to an increase in temperature resulting from the external contact.

It is a related aspect of the present disclosure to provide the sensor body having a varying cross-sectional area as viewed in lateral cross-section between the first and second ends, wherein the cross-sectional change in area can be stepped and/or continuously varying, thereby being able to be customized to any application envelope.

It is a related aspect of the present disclosure to provide the variable resistance conductive rubber sensor with a sensor body having an activation angle extending completely or substantially about the entirety of an outer surface of the sensor body.

It is a related aspect of the present disclosure to provide the sensor body as a sheet of material configured to line a vehicle passage seat to detect the presence of a passenger.

It is a related aspect of the present disclosure to provide the sensor body as an elongate strip of material configured as a pinch sensor for a vehicle window.

It is a related aspect of the present disclosure to provide the sensor body to sense pressure and/or temperature change.

It is a related aspect of the present disclosure to providing the sensor body with an ability to be compressed, bent, twisted and/or stretched.

It is a related aspect of the present disclosure to provide a method for detecting the presence of an object/human touch against a vehicle component in at least one of a vehicle window, vehicle closure member, vehicle trim panel, and vehicle seating application. The method including disposing a sensor, including a sensor body constructed from electrically conductive rubber that is operably connected to a microcontroller, adjacent the vehicle component.

These and other alternative embodiments are directed to providing a sensor/switch having a variable resistance conductive rubber sensor body for detection of at least one of pressure and thermal change when a component of a motor vehicle is contacted.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are intended to illustrate selected embodiments of the present disclosure and are not intended to limit the scope of the present disclosure, wherein.

DETAILED DESCRIPTION

For purposes of descriptive clarity, the present disclosure is described herein in the context of one or more specific vehicular applications, namely powered windows. However, upon reading the following detailed description in conjunction with the appended drawings, it will be clear that the inventive concepts of the present disclosure can be applied to numerous other systems and applications, such as, for example, power lift gates, power roof panels, deck-lids, trim panel movement detection; exterior door handle activation pressure detection; non-planar switch applications, including occupant detection on a vehicle seat, for example.

Figure 1:
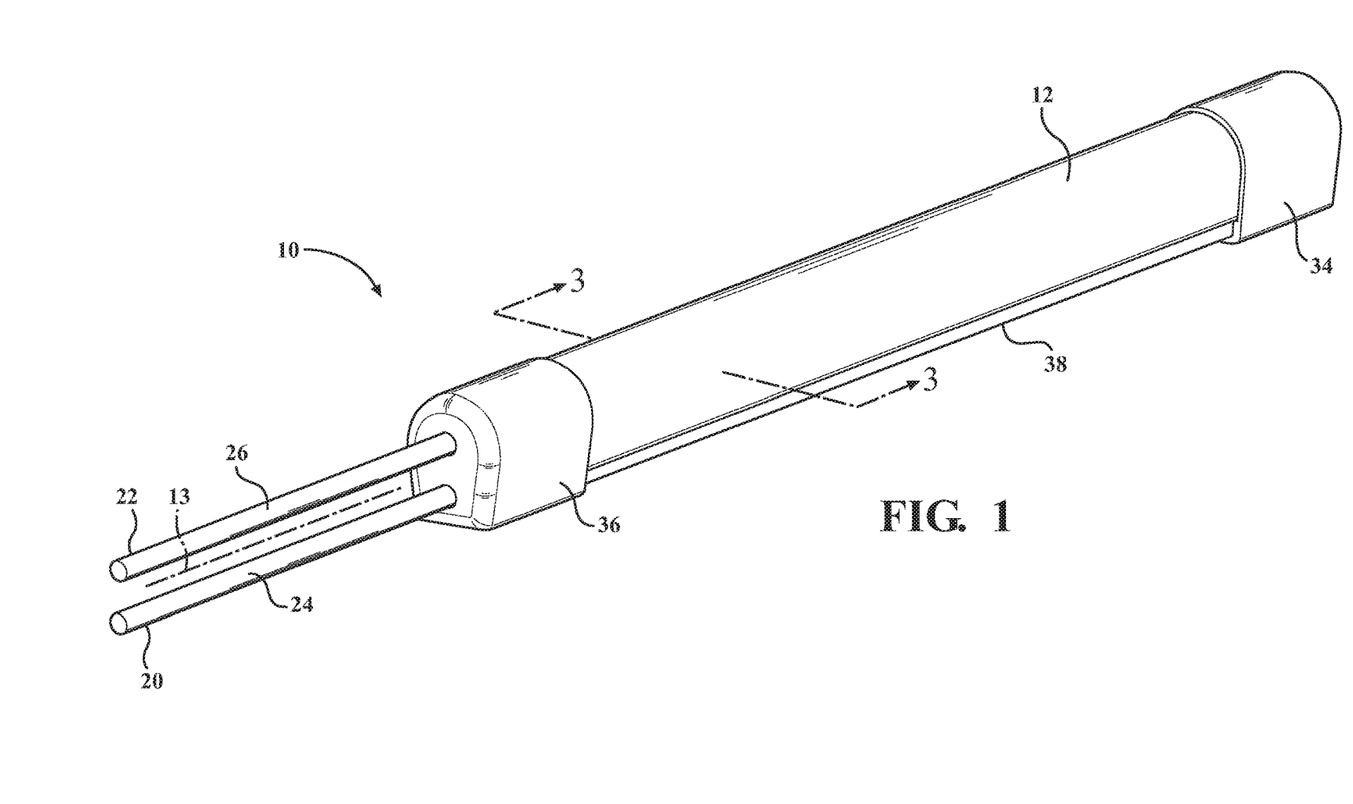
FIG. 1 is a schematic perspective top view of variable resistance conductive rubber sensor constructed in accordance with one aspect of the teachings of the present disclosure.
Figure 2:
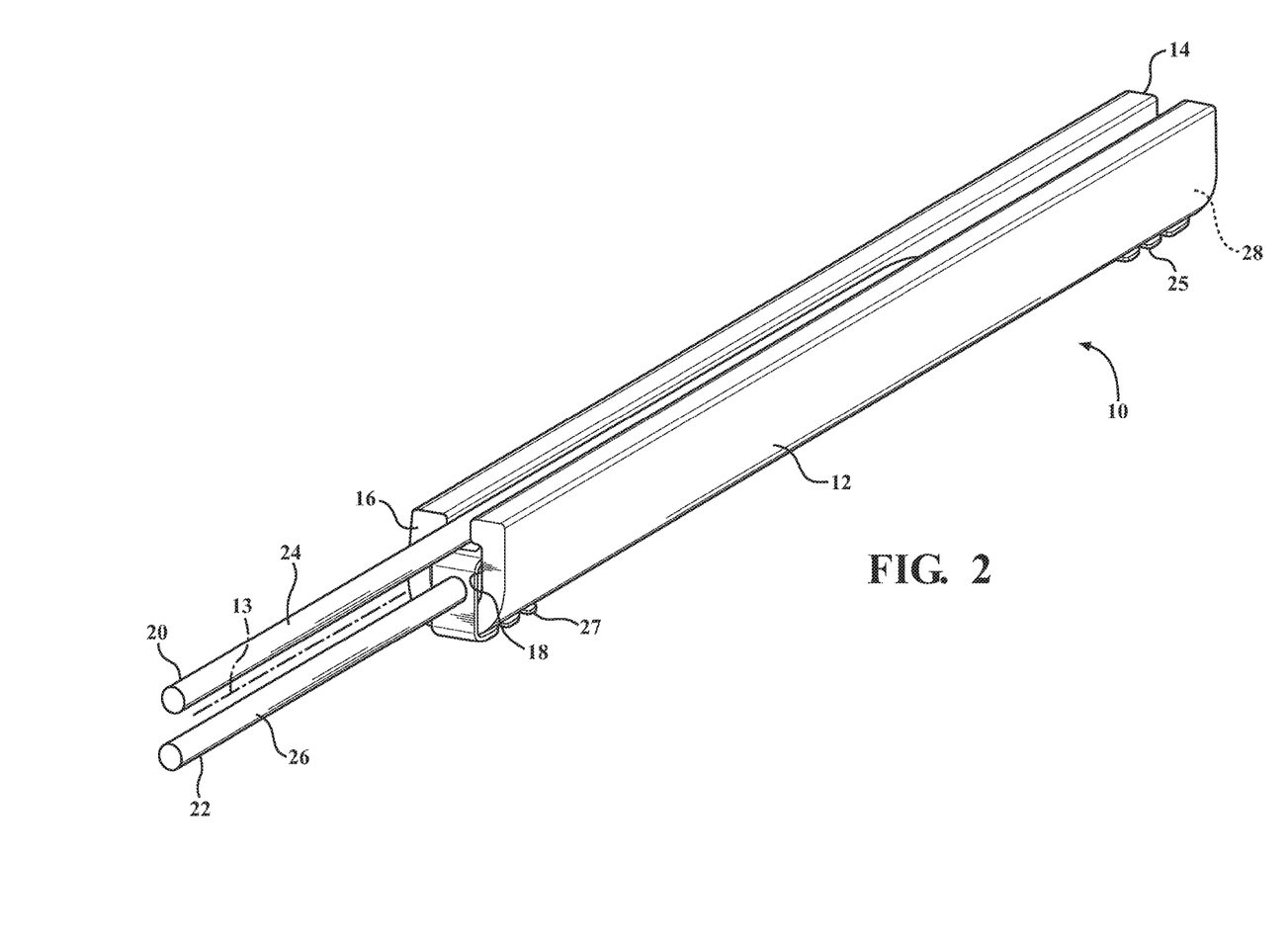
FIG. 2 is a schematic perspective bottom view of the variable resistance conductive rubber sensor of FIG. 1 with end caps and a bottom mounting strip removed.
Figure 3:
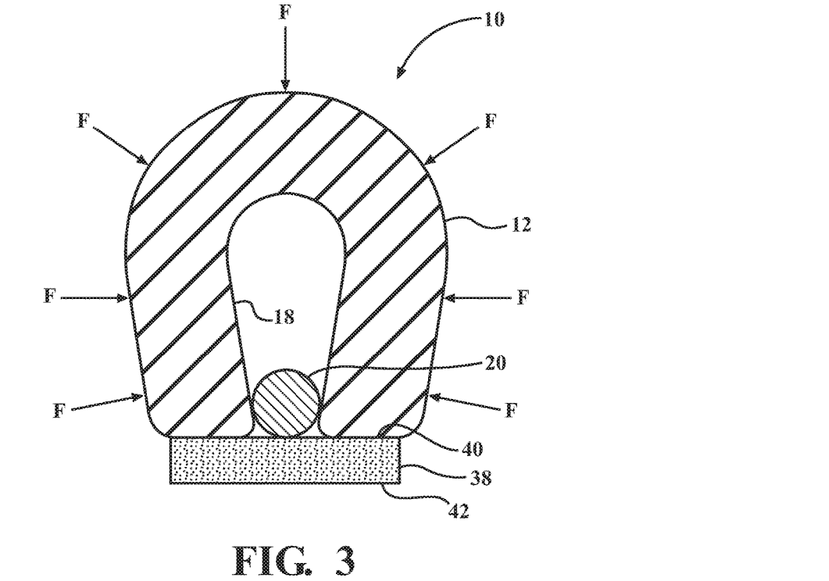
FIG. 3 is a schematic cross-sectional view taken generally along the line 3-3 of FIG. 1.
Figure 4:
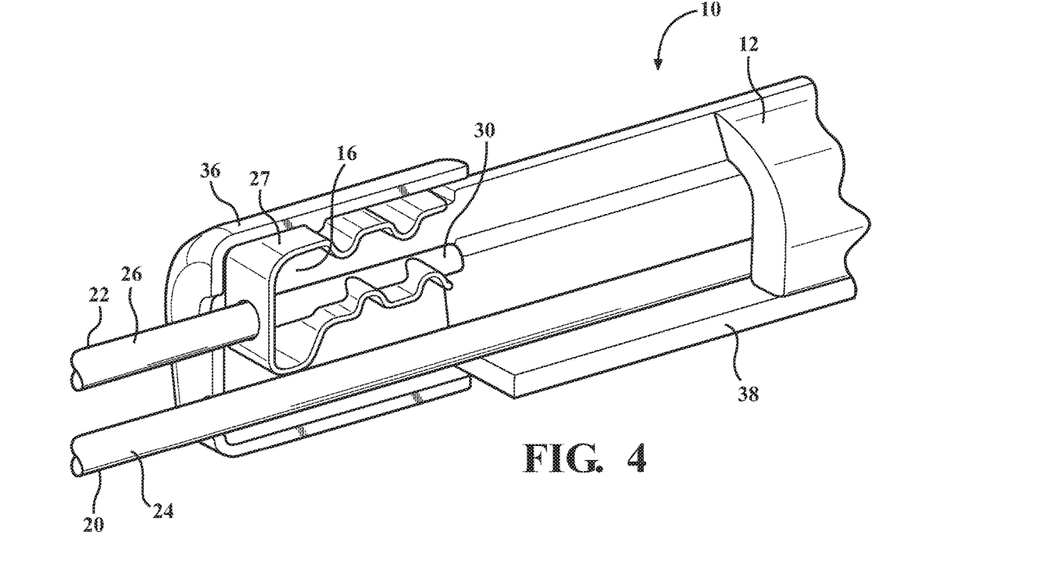
FIG. 4 is a schematic, partially broken-away, fragmentary perspective view of the variable resistance conductive rubber sensor of FIG. 1.
Figure 5:
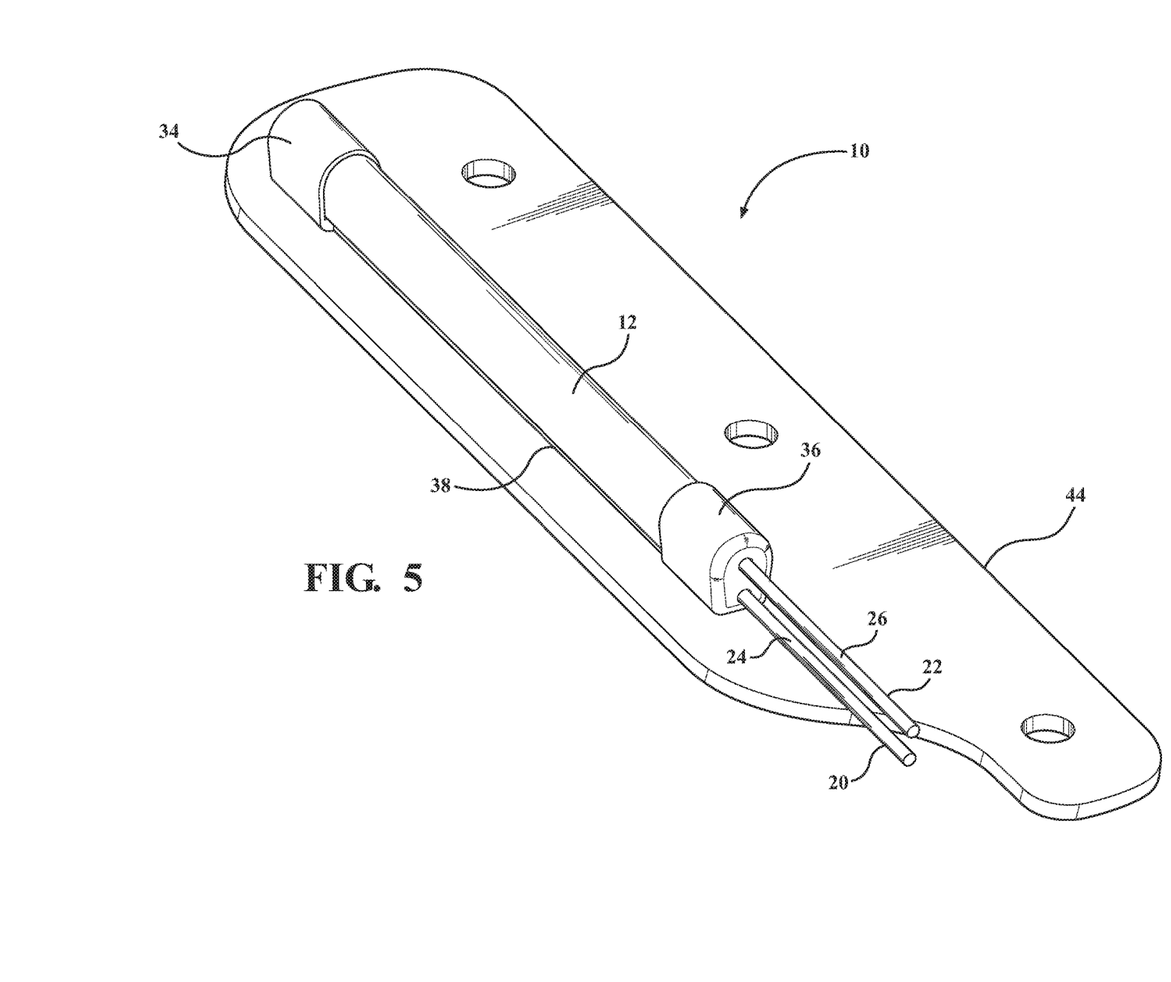
FIG. 5 is a schematic perspective view of the variable resistance conductive rubber sensor of FIG. 1 shown attached to a carrier member of a vehicle in accordance with one aspect of the teachings of the present disclosure.
Figure 13:
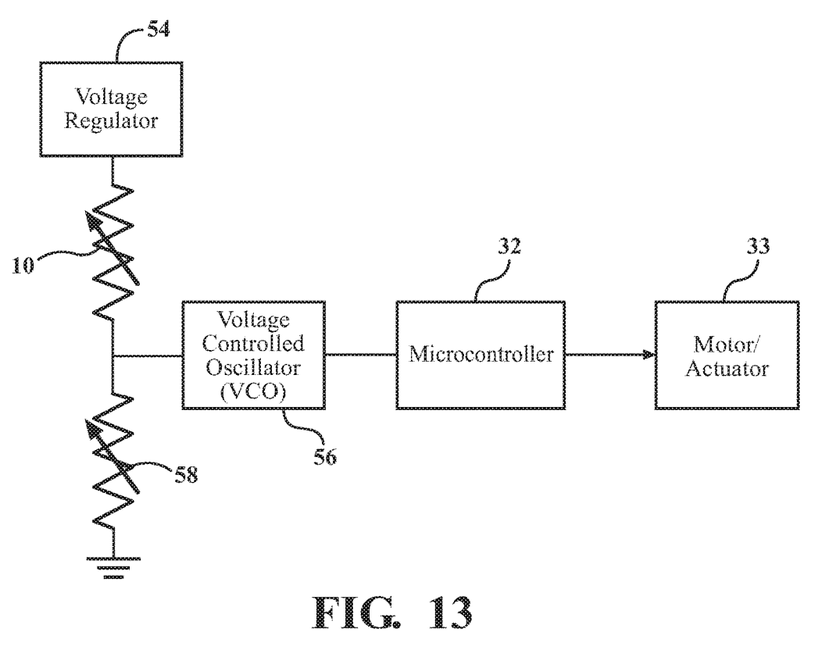
FIG. 13 is an electronic schematic diagram of a sensor assembly constructed in accordance with one aspect of the invention.

Referring now in more details to the drawings, FIGS. 1-5 illustrate an embodiment of a variable resistance conductive rubber sensor assembly, and referred to hereafter simply as sensor 10, which is also actively functional as a switch, in accordance with one aspect of the invention. The sensor 10 has a sensor body 12 constructed of a conductive elastomer, such as conductive rubber. The sensor body 12 is shown, by way of example and without limitation, as extending lengthwise along an axis 13 between a first end 14 and a second end 16 spaced therefrom (FIG. 2). The sensor body 12 is longitudinally flexible relative to the axis 13, twistable in torsion about the axis 13, and radially compressible. According to an aspect and as best shown in FIGS. 2 and 3, the sensor body 12 may have a recessed channel 18 extending axially between the first end 14 to the second end 16, thereby providing the sensor body 12 with a generally U-shaped configuration as viewed in lateral cross-section (FIG. 3). The sensor 10 may also include a pair of electrically conductive members, referred to hereafter as first and second wires 20, 22, wherein each of the wires 20, 22 may be insulated along its length by an insulation sheath 24, 26 on its outer surface. The second wire 22 has a second bare end 30, as best shown in FIG. 4, exposed from the second insulation sheath 26 for operable electrical connection via a second electrical connector 27 to the second end 16 of the conductive sensor body 12, while the first wire 20 extends along the length of the channel 18, with a first bare end 28 thereof being exposed from the first insulation sheath 24 for operable electrical connection via a first electrical connector 25 with the first end 14 of the conductive sensor body 12. In this way, each of the wires 20, 22 is electrically connected to an associated one of the ends 14, 16 opposite the other one of the ends 14, 16 to which the other one of the wires 20, 22 is electrically connected. It should be recognized that the portion of the first wire 20 covered by the first insulation sheath 24 that extends through the channel 18 is not in direct electrical communication with the conductive sensor body 12, as it is insulated therefrom. The sensor body 12, when acted upon by an applied force resulting from an external contact, is elastically deformed, such as by being compressed, twisted or stretched, and as a result, the conductive material of the sensor body 12 exhibits an increase in electrical resistance. Such an external contact may result from contact with an object or a human body. As such, as shown in FIG. 13, with a voltage being applied across the sensor body 12 via the wires 20, 22, changes in voltage can be detected via a microcontroller 32, which bay be configured to execute a desired and selected task, such as via an actuator 33. The microcontroller 32 may, for example, use a software algorithm to detect a change in voltage across the sensor body 12 to detect the external contact with the sensor body 12.

The sensor body 12 can be formed from any suitable elastic conductive material, and in accordance with one presently preferred aspect, can be formed from carbon-black silicone rubber. One such carbon-black silicone rubber material tested had a hardness of 45+/−5 on the Shore A scale; a specific gravity (g/cc) of 1.16+/−0.10; a carbon-black content of about 15+/−5%; a tensile strength (N/mm2) of about 3.0 MPa+/−0.5 MPa; and an elongation at break (%) between about 150-300. Further, the sensor body 12 can be formed to take on any desired configuration, such as via a molding or extrusion process. Accordingly, the sensor body 12 can be configured to conform to a wide variety of applications requiring a pressure sensor/switch. By virtue of being molded or extruded, the complexity of forming the sensor body 12 is minimized, and thus, so too is the cost associated with its manufacture. Being molded or extruded allows great flexibility as to the formable geometry of the sensor body 12, wherein the sensor body 12 can be formed having a uniform, constant profile along its length, or it can be formed having a varying profile along its length, including varying widths and/or thicknesses, whether stepped or continuously varying. Accordingly, depending on the application, the sensor body 12 can be formed having virtually any desired shape/geometry to fit within the envelope available in the intended application. In addition to the sensor body 12 being useful to detect applied forces as a result of being physically acted upon, i.e. compressed, stretched, twisted, the sensor body 12 material is also able to detect human touch as a result of localized or global change in temperature of the material. Of course, to avoid unwanted activation signals being triggered by the microcontroller 32, the microcontroller 32 can be programmed to account for any anticipated environmental conditions, such expected thermal conditions, by way of example and without limitation. With the sensor body 12 acting as a variable resistor along its entire body, the activation angle (span of angle over which an applied force is able to be detected) of the sensor body 12 extends over and about the entirety or substantial entirety of the outer surface of the sensor body 12, thereby resulting in a vastly increased activation angle for applied forces (F, see FIGS. 1 and 3) in comparison to sensors requiring wires extending therethrough to brought into contact with one another.

The sensor 10 is further shown as having a pair of end caps 34, 36 disposed over the ends 14, 16 of the sensor body 12. The end caps 34, 36 function to conceal the connectors 25, 27 and exposed ends 28, 30 of the wires 20, 22 against exposure to the outside environment. The end caps 34, 36 can be made of any suitable non-conductive polymeric material, and can be formed as desired, such as in a molding operation, by way of example and without limitation. The end caps 34, 36 may have a low profile shape, conforming substantially to the outer shape of the sensor body 12. The end caps 34, 36 can be secured to the ends 14, 16 of the sensor body 12 via any suitable adhesive, press-fit, fastener, or otherwise.

To facilitate attaching the sensor 10 to a mating vehicle component 44 (FIG. 5) in assembly, and further, to close off the channel 18 through which the second wire 22 extends, a backing member 38 can be attached along a segment of the sensor body 12 between the end caps 34, 36, or along the entire length of the sensor body 12 and over the channel 18 (FIGS. 1, 3 and 4; FIG. 2 shown prior to application of the backing member thereto). The backing member 38 can be attached to the sensor body 12 along one or more of its sides 40 via any suitable bonding means, including an adhesive glue, pressure-sensitive adhesive, melting, welding, or other suitable method, and can be attached to the mating vehicle component in like fashion along an opposite, outwardly facing side 42. Accordingly, it should be recognized that a double-sided self-adhesive strip or tape could be used for the backing member 38.

Figure 6:
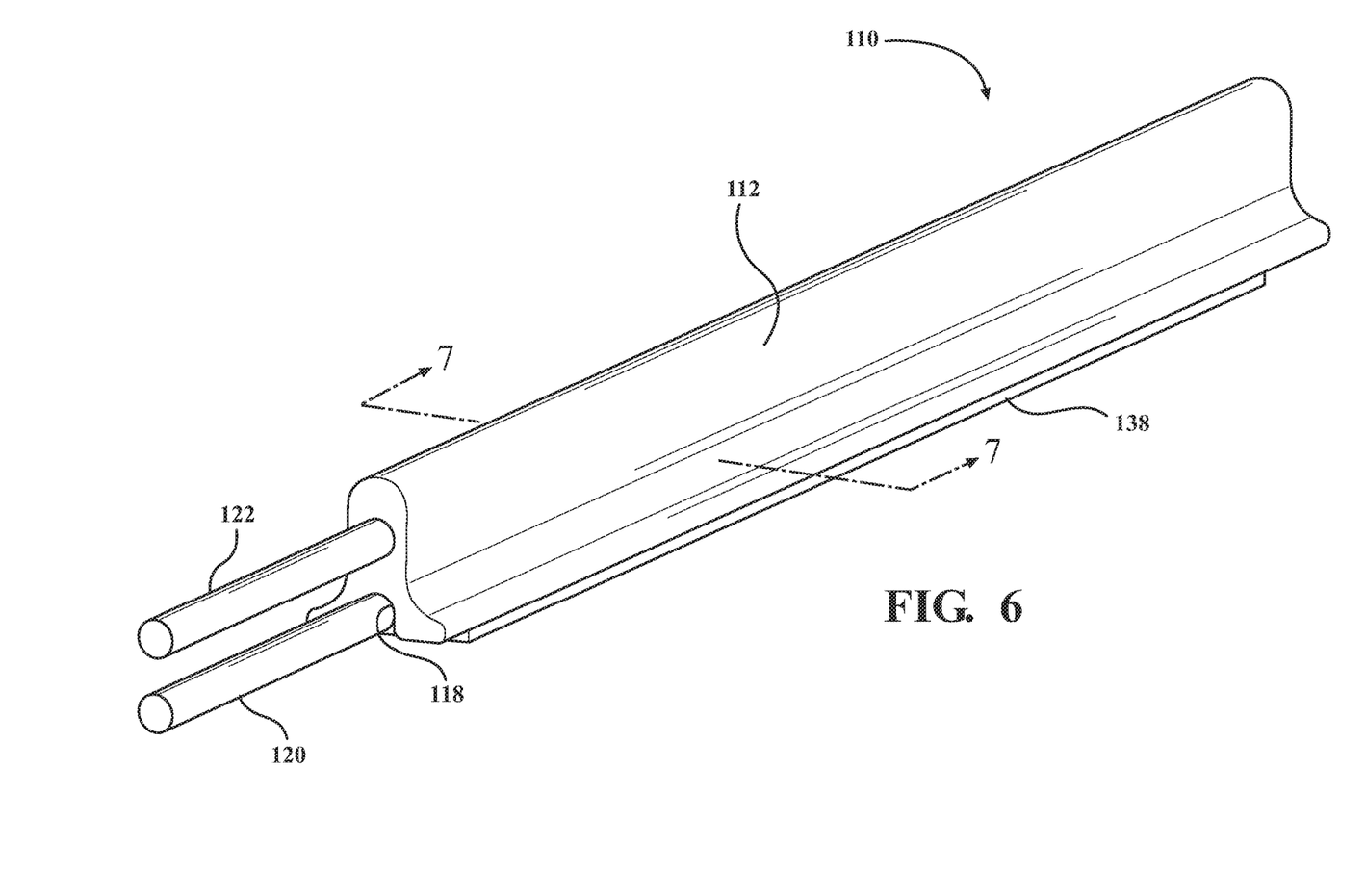
FIG. 6 is a schematic perspective top view of variable resistance conductive rubber sensor constructed in accordance with another aspect of the teachings of the present disclosure.
Figure 7:
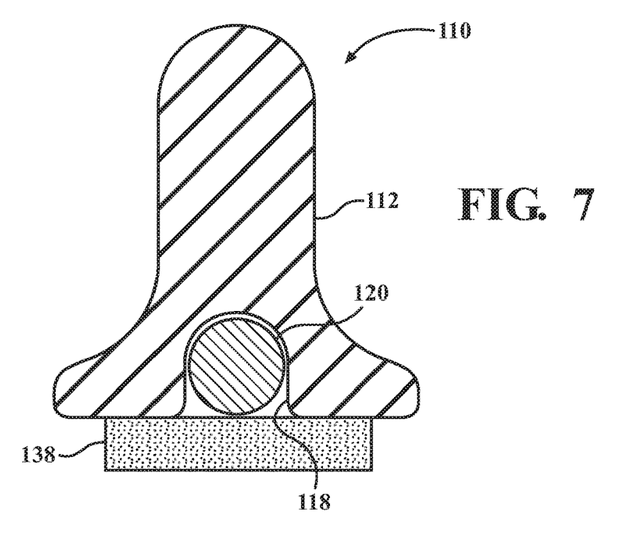
FIG. 7 is a schematic cross-sectional view taken generally along the line 7-7 of FIG. 6.

In FIGS. 6 and 7, a sensor 110 constructed in accordance with another aspect of the invention is shown, wherein the same reference numbers, offset by a factor of 100, are used to identify like features as discussed above.

The sensor 110 is generally the same as discussed above for the sensor 10; however, the shape of the sensor body 112 is different. Rather than having a generally U-shaped body as viewed in lateral cross-section, the sensor body 112 is generally T-shaped in lateral cross-section, having a narrow portion 117 extending from a wider base 119 and a relatively shallow channel 118 extending into increased wider base 119 of the body 112. Otherwise, the sensor 110 has all the same components as discussed above for the sensor 10, including the pair of wires 120, 122; the end caps (not shown), and a backing member 138. With the sensor 110 being shaped in such fashion, height of the sensor body 112 can be increased and the width can be decreased. Of course, it is to be understood that numerous other shapes and configuration of the sensor body are possible, and contemplated to be within the scope of the invention, as discussed above, including low-profile, generally flat configurations.

Figure 8:
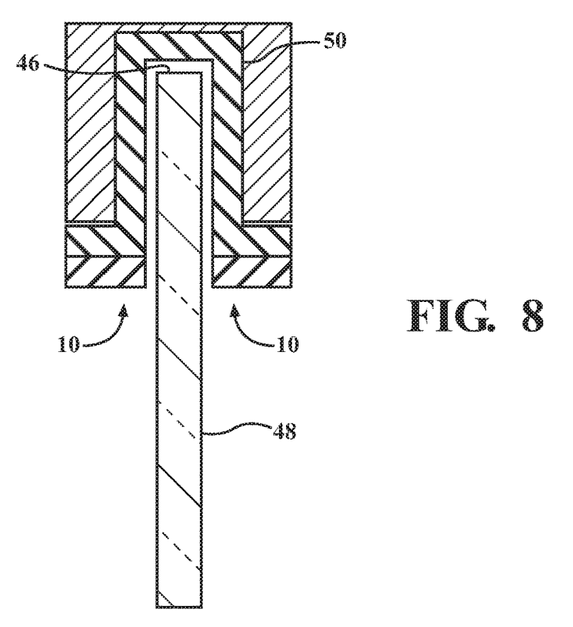
FIG. 8 is a schematic side view of a window application including a variable resistance conductive rubber sensor in accordance with one aspect of the teachings of the present disclosure with a window shown in a fully raised position.
Figure 9:
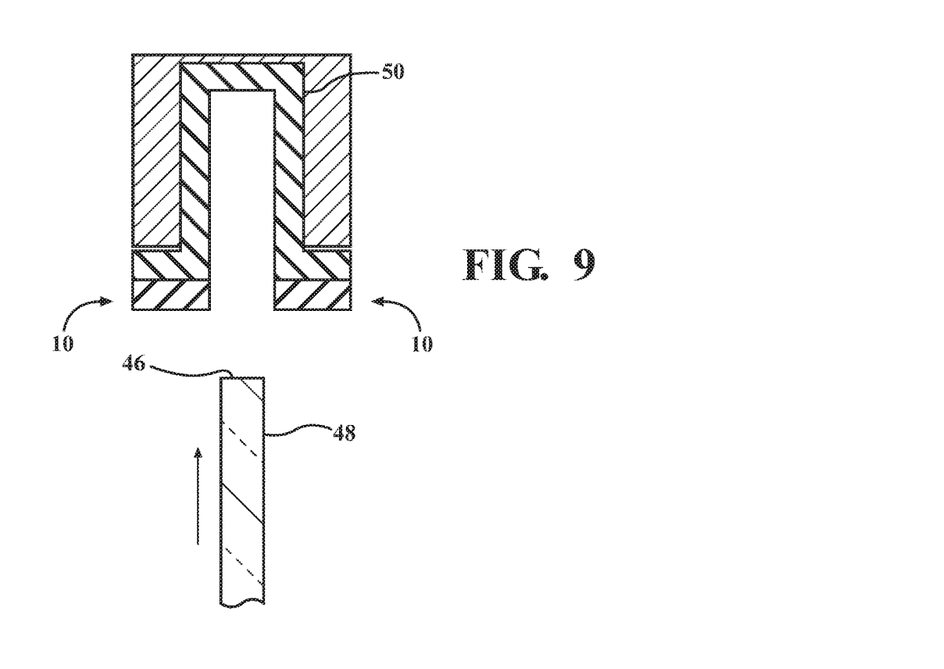
FIG. 9 is a view similar to FIG. 8 with the window shown in a lowered position.
Figure 10:
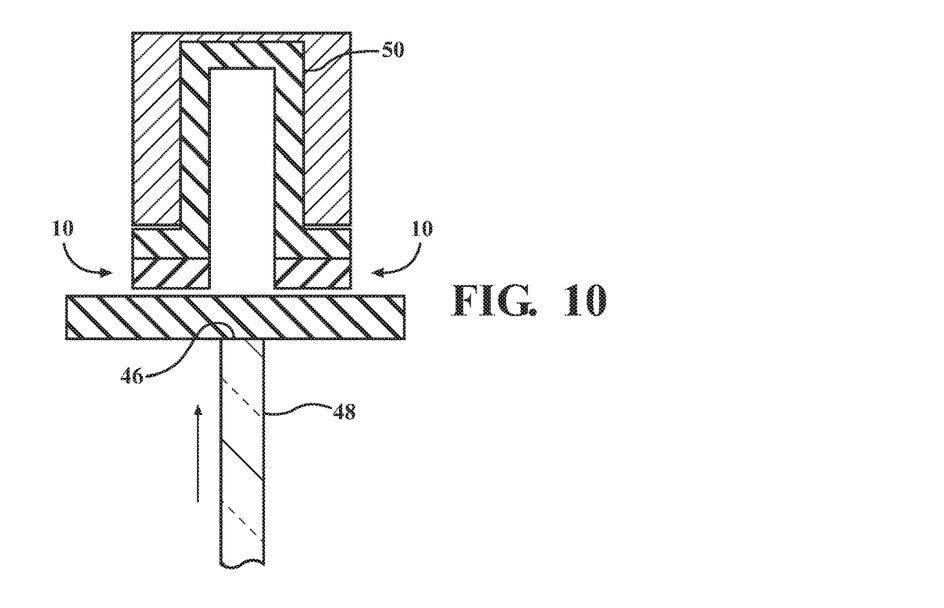
FIG. 10 is a view similar to FIG. 8 with an object shown blocking the upward travel of the window and abutting the variable resistance conductive rubber sensor.

In FIGS. 8-10, a vehicle window application is shown, by way of example and without limitation, wherein a pair of sensors 10 constructed in accordance with the invention are used as pinch sensors to indicate when an object 52 comes between a leading edge 46 of a widow 48 and the sensors 10. The sensors 10 are shown as being fixed to an upper door header 50 of the vehicle, such as via the backing member 38. In FIG. 8, the window 48 is shown in a fully closed, position, without any obstruction present. In FIG. 9, the window 48 is shown in a lowered position, and in FIG. 10 the window 48 is shown being raised from the lowered position of FIG. 9 toward the closed position of FIG. 8; however, an object 52 is shown disposed between the leading edge 46 of the window 48 and the upper door header 50. The object 52, upon impacting the sensor or sensors 10, causes the respective sensor 10 to be radially compressed, and thus, as discussed above, the resistance of the sensor 10 is increased, thereby triggering an action to reverse the direction of travel of the window 48.

As shown schematically in FIG. 13, a constant voltage is applied to the pinch strip 10, such as via a low-dropout voltage regulator 54 having a maximum current output of about 20 mA and applying about 1.0 volts +/−1%, by way of example and without limitation. Further, a voltage controlled pulse width modulator (VCPWM) 56 may be disposed between the pinch strip or sensor 10 and a fixed resistor 58, wherein the VCPWM 56 measures the voltage at the input and varies the output pulse width at a frequency of about 1 kHz, by way of example and without limitation. The voltage controlled pulse width modulator (VCPWM) may include a voltage controlled oscillator (VCO), as shown in FIG. 13. As the resistance of the pinch strip or sensor 10 varies, such by being increased under the application of the compression force to the sensor body 12 by the object 52, the pulse width output of the VCPWM 56 decreases, and the microcontroller 32, sometimes referred to as microcontrol unit, causes the window 48 to reverse direction via an actuator 33 back toward an open position. The microcontroller 32 can be configured to sample the voltage input about every 10 ms, by way of example and without limitation, and if the resistance of the pinch strip 10 is determined to have changed by more than about 5% from a baseline resistance, a pinch condition is detected, and the microcontroller 32 commands the actuator 33 to respond accordingly.

The baseline resistance can be set via a sampling monitored by the microcontroller 32, thereby allowing the microcontroller 32 to account for environmental conditions, such as ambient temperature, humidity and vibration, for example. With the above noted sampling being performed about every 10 ms, the microcontroller 32 can be configured to calculate an average of the pulse widths, such as between about every 1-5 minutes, by way of example and without limitation. Then, having calculated the baseline of an average of the pulse widths, the microcontroller 32, upon detecting a change in resistance of about 5%, will cause the aforementioned action to be taken by the actuator 33.

Figure 11A:
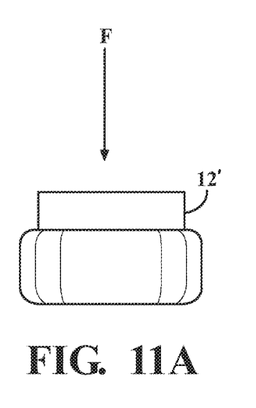
FIGS. 11A-11D illustrate various orientations of variable resistance conductive rubber sensors tested.
Figure 11B:
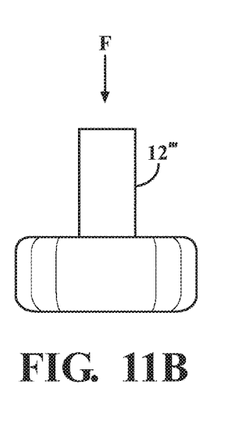
Figure 11C:
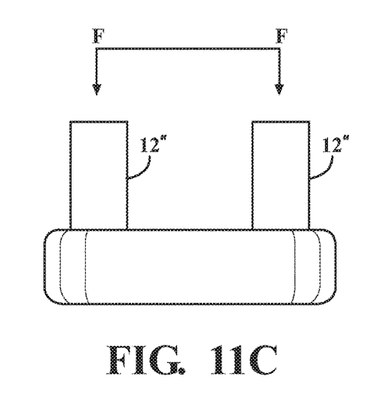
Figure 11D:
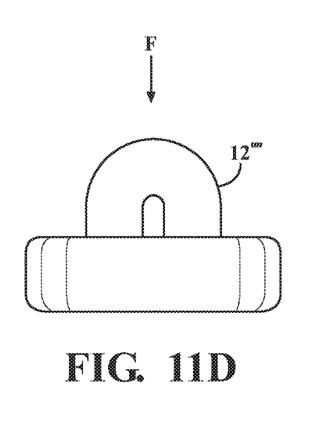
Figure 12:
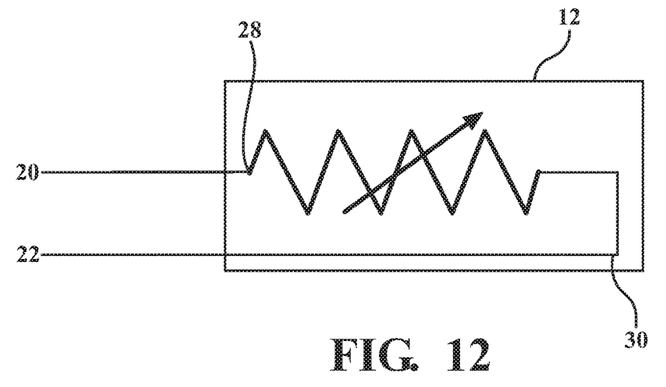
FIG. 12 is an electronic schematic diagram of a sensor constructed in accordance with one aspect of the invention.

In FIGS. 11A-11D, various orientations of sensor bodies 12 are shown, including a horizontal sensor body 12' in FIG. 11A; a dual vertical sensor body 12" in FIG. 11B; a single vertical sensor body 12" in FIG. 11C; and a dome-shaped sensor body 12" in FIG. 11D, for which test results were obtained and reported in Table 1, to determine the magnitude of resistance change for the given configuration upon being impacted by controlled forces (10N, 20N, 30N). The test results show that the greatest percent resistance change (kΩ) was found for the single vertical sensor body 12" configuration.

exterior trim applications, interior/exterior handle applications, and various closure member applications can benefit from the incorporation of a sensor having a variable resistance conductive sensor body constructed in accordance with the invention. It is to be further understood that applications requiring a sensor/switch to be activated in response to thermal conditions and/or human touch can also benefit from a sensor/sensor body constructed in accordance with the invention, as the variable resistance material of the sensor body can be monitored by the microcontroller for changes in response to thermal changes/touch, with the microcontroller being configured, such as via the aforementioned moving average algorithm of ambient temperature, to determine anticipated, normal changes in temperature, which would not initiate a command instruction from the microcontroller, versus changes in temperature due to human touch, which would initiate a command from the microcontroller.

It is a related aspect of the present disclosure to provide a method for detecting the presence of an object/human touch against a vehicle component in at least one of a vehicle window, vehicle closure member, vehicle trim panel, and vehicle seating application. The method including disposing a sensor 10, including a sensor body 12 constructed from electrically conductive rubber that is operably connected to a microcontroller which may be located adjacent the vehicle component. The sensor body 12 can be configured as described above, and thus, can be constructed, via molding or extrusion, to accommodate any desired vehicle window, vehicle closure member, vehicle trim panel, and vehicle seating envelope.

The above-described embodiments of the invention are intended to be examples of the present invention and alterations and modifications may be effected thereto, by those of skill in the art, without departing from the spirit of the invention.

What is claimed is:

1. A variable resistance conductive rubber sensor comprising:
    a sensor body made of conductive elastomer defining an outer shape and extending along an axis between a first

TABLE 1

| PINCH STRIP TESTING STRIP ORIENTATION | LOAD APPLIED N | HARD BACKING, 4 MM OBJECT INITIAL RESISTANCE KOHMS | 3 mm thick Shore 45 FINAL RESISTANCE KOHMS | AMBIENT % CHANGE |
|---|---|---|---|---|
| HORIZONTAL (FIG. 11A) | 10 | 270.00 | 310.00 | 15% |
|  | 20 | 270.00 | 390.00 | 44% |
|  | 30 | 270.00 | 450.00 | 67% |
| SINGLE VERTICAL (FIG. 11B) | 10 | 209.00 | 330.00 | 58% |
|  | 20 | 209.00 | 550.00 | 163% |
|  | 30 | 209.00 | 610.00 | 192% |
| DOUBLE VERTICAL (FIG. 11C) | 10 | 88.00 | 98.00 | 11% |
|  | 20 | 88.00 | 116.00 | 32% |
|  | 30 | 88.00 | 155.00 | 76% |
| DOME (FIG. 11D) | 10 | 168.00 | 171.00 | 2% |
|  | 20 | 168.00 | 182.00 | 8% |
|  | 30 | 168.00 | 193.00 | 15% |

Accordingly, given the description above, in association with the various Figures, it is to be understood that various configurations of sensor bodies are possible, including elongate strips and planar or substantially planar sheets, which are contemplated to be within the scope of the invention. For example, in addition to the window application shown, many other applications, including by way of example and without limitation, planar and non-planar applications, such as vehicle seat occupant detection applications, interior/ end of the sensor body and a second end of the sensor body spaced therefrom and being longitudinally flexible relative to the axis and twistable about the axis and radially compressible;

a first wire operably connected via a first electrical connector to the first end of the sensor body; and wherein the sensor body exhibits an increase in electrical resistance in response to external contact.

2. The variable resistance conductive rubber sensor of claim 1 further including a microcontroller operably connected to the first wire.

3. The variable resistance conductive rubber sensor of claim 1 further including a resistor operably coupled in series with the sensor body.

4. The variable resistance conductive rubber sensor of claim 3 further including a voltage controlled pulse width modulator between and operably coupled with the sensor body and the resistor.

5. The variable resistance conductive rubber sensor of claim 1 wherein the sensor body exhibits an increase in electrical resistance in response to being elastically deformed when acted upon by an applied force resulting from the external contact.

6. The variable resistance conductive rubber sensor of claim 1 wherein the sensor body exhibits an increase in electrical resistance in response to an increase in temperature resulting from the external contact.

7. The variable resistance conductive rubber sensor of claim 1 further including the sensor body having a recessed channel extending axially between the first end and the second end;
the first wire extending axially through the recessed channel of the sensor body and being insulated along its length by a first insulation sheath and extending to a first bare end exposed from the first insulation sheath; and
wherein the first insulation sheath electrically insulates the first wire from the recessed channel to prevent direct electrical communication therebetween.

8. The variable resistance conductive rubber sensor of claim 7 further including a backing member attached along a portion of the sensor body between the first end and the second end to attach the sensor body to a vehicle component; and
wherein the backing member is attached across the recessed channel through which the first wire extends.

9. The variable resistance conductive rubber sensor of claim 1 further including a backing member attached along a portion of the sensor body between the first end and the second end to attach the sensor body to a vehicle component.

10. The variable resistance conductive rubber sensor of claim 1 further including a second wire operably connected via a second electrical connector to the second end of the sensor body; and
wherein the first and second wires are in electrical communication with one another through the sensor body extending therebetween.

11. The variable resistance conductive rubber sensor of claim 1 further including a first end cap disposed over the first end to conceal the first electrical connector.

12. The variable resistance conductive rubber sensor of claim 1 wherein the conductive elastomer is a carbon-black silicon rubber.

13. The variable resistance conductive rubber sensor of claim 1 wherein the sensor body has a constant profile along its length between the first end and the second end.

14. The variable resistance conductive rubber sensor of claim 1 wherein the sensor body has a varying profile along its length between the first end and the second end.

15. The variable resistance conductive rubber sensor of claim 14 wherein the sensor body has a profile that varies abruptly at a step between the first end and the second end.

16. The variable resistance conductive rubber sensor of claim 14 wherein the sensor body has a profile that varies continually between the first end and the second end.

17. The variable resistance conductive rubber sensor of claim 1 wherein the sensor body has a generally rectangular cross section.

18. The variable resistance conductive rubber sensor of claim 1 wherein the sensor body has a generally U-shaped cross section.

19. The variable resistance conductive rubber sensor of claim 1 wherein the sensor body has a generally T-shaped cross section having a narrow portion extending from a wider base.

20. A method of detecting the presence of an object/human touch against a vehicle component in at least one of a vehicle window, vehicle closure member, vehicle trim panel, and vehicle seating application, comprising:
disposing a sensor, including a sensor body constructed from electrically conductive rubber that is operably connected to a microcontroller, adjacent the vehicle component;
measuring by the microcontroller electrical resistance of the sensor body;
determining by the microcontroller the presence of an object/human touch by the electrical resistance of the sensor body being greater than a baseline value.

21. The method of claim 20 further including the step of determining the baseline value based on a plurality of previously measured values of the electrical resistance of the sensor body.

* * * * *